(12) United States Patent
Noh et al.

(10) Patent No.: US 11,108,060 B2
(45) Date of Patent: Aug. 31, 2021

(54) FUEL CELL STACK STRUCTURE

(71) Applicant: LG CHEM, LTD., Seoul (KR)

(72) Inventors: Tai Min Noh, Daejeon (KR); Jaesung Kim, Daejeon (KR); Sanghyeok Im, Daejeon (KR); Kwangyeon Park, Daejeon (KR); Ye Hoon Im, Daejeon (KR); Kwangwook Choi, Daejeon (KR); Junwon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/493,194

(22) PCT Filed: Jul. 18, 2018

(86) PCT No.: PCT/KR2018/008125
§ 371 (c)(1),
(2) Date: Sep. 11, 2019

(87) PCT Pub. No.: WO2019/022432
PCT Pub. Date: Jan. 31, 2019

(65) Prior Publication Data
US 2020/0020961 A1    Jan. 16, 2020

(30) Foreign Application Priority Data

Jul. 26, 2017  (KR) .................. 10-2017-0094709

(51) Int. Cl.
*H01M 8/0273*     (2016.01)
*H01M 8/2475*     (2016.01)
(Continued)

(52) U.S. Cl.
CPC ....... *H01M 8/0273* (2013.01); *H01M 8/2475* (2013.01); *H01M 8/04067* (2013.01); *H01M 8/242* (2013.01); *H01M 8/248* (2013.01)

(58) Field of Classification Search
CPC ............. H01M 8/0273; H01M 8/0276; H01M 8/2475; H01M 8/04067; H01M 8/242;
(Continued)

(56) References Cited

U.S. PATENT DOCUMENTS 8,889,303 B2   11/2014  Meinhardt
10,008,732 B2   6/2018  Choi et al.
(Continued)

FOREIGN PATENT DOCUMENTS

EP     3 208 875 A1    8/2017
JP     2004-273140 A   9/2004
(Continued)

OTHER PUBLICATIONS

International Search Report (PCT/ISA/210) issued in PCT/KR2018/008125, dated Oct. 26, 2018.

*Primary Examiner* — Ula C Ruddock
*Assistant Examiner* — Matthew W Van Oudenaren
(74) *Attorney, Agent, or Firm* — Birch, Stewart, Kolasch & Birch, LLP (57) ABSTRACT

A fuel cell stack structure in which unit cells are stacked includes first window frames and second window frame. The second window frames each have an area larger than an area of a first window frame and are periodically disposed at a predetermined interval in a direction in which the unit cells are stacked. Heat movement is promoted, a temperature deviation in the fuel cell stack structure is mitigated, and a temperature distribution is uniformized.

10 Claims, 7 Drawing Sheets

(51) Int. Cl.
      *H01M 8/248*       (2016.01)
      *H01M 8/242*       (2016.01)
      *H01M 8/04007*     (2016.01)

(58) Field of Classification Search
      CPC ....... H01M 8/2432; H01M 2008/1293; H01M 8/248; H01M 8/0407; H01M 8/2404; H01M 8/245; H01M 8/246; H01M 8/2425
      See application file for complete search history.

(56) References Cited

U.S. PATENT DOCUMENTS

| | | | |
|---|---|---|---|
| 10,256,495 | B2 | 4/2019 | Hotta et al. |
| 2006/0105213 | A1 | 5/2006 | Otsuka |
| 2015/0263372 | A1* | 9/2015 | Choi .................... H01M 8/247 429/465 |

FOREIGN PATENT DOCUMENTS

| | | | |
|---|---|---|---|
| JP | 2008-311112 | A | 12/2008 |
| JP | 2010-238436 | A | 10/2010 |
| JP | 2012-3941 | A | 1/2012 |
| JP | 2012003941 | * | 1/2012 |
| JP | 2013-55042 | A | 3/2013 |
| JP | 2015-32477 | A | 2/2015 |
| KR | 10-2011-0114584 | A | 10/2011 |
| KR | 10-2012-0075244 | A | 7/2012 |
| KR | 10-2014-0002195 | A | 1/2014 |
| KR | 10-2014-0024776 | A | 3/2014 |
| KR | 10-2015-0001402 | A | 1/2015 |
| KR | 10-1664382 | B1 | 10/2016 |

\* cited by examiner

| | (a) COMPARATIVE EXAMPLE | (b) MANUFACTURE EXAMPLE |
|---|---|---|
| 1KW STACK ANALYSIS CONDITION | | |
| Current(A) | 40.5 | 40.5 |
| Effective Area (cm2) | 90.25 | 90.25 |
| Current density (mA/cm2) | 448.75 | 448.75 |
| INITIAL VOLTAGE(V) | 0.764 | 0.764 |
| H2(sccm) | 13691 | 13691 |
| Air(sccm) | 68456 | 68456 |

FUEL CELL STACK STRUCTURE

TECHNICAL FIELD

This application claims priority to and the benefit of Korean Patent Application No. 10-2017-0094709 filed in the Korean Intellectual Property Office on Jul. 26, 2017, the entire contents of which are incorporated herein by reference.

The present invention relates to a fuel cell stack structure, and more particularly, to a fuel cell stack structure in which unit cells are stacked, and second window frames, which each have an area larger than an area of a first window frame, are periodically disposed at a predetermined interval in a direction in which the unit cells are stacked, such that heat movement is promoted, a temperature deviation in the fuel cell stack structure is mitigated, and a temperature distribution is uniformized.

BACKGROUND ART

Recently, with the depletion of the existing energy resources such as petroleum or coal, there is an increasing interest in alternative energy which may be substituted for the existing energy resources. A unit cell has attracted attention as one of the alternative energy resources, and particularly, the unit cell has an advantage in that the unit cell has high efficiency, emits no pollutant, and provides plentiful fuel, such that researches on the unit cell are being actively conducted. In general, the unit cell has an air electrode and a fuel electrode which are formed at both sides of an electrolyte, respectively, the fuel electrode is configured as an anode, the air electrode is configured as a cathode, fuel is oxidized when fuel is supplied to the fuel electrode such that electrons are emitted through an external circuit, and the air electrode receives the electrons from the external circuit when oxygen is supplied to the air electrode such that the oxygen is reduced into oxygen ions. The reduced oxygen ions move to the fuel electrode through the electrolyte, react with the oxidized fuel, and produce water. A solid oxide fuel cell (SOFC), among the unit cells, is a unit cell which operates at a high temperature of about 600° C. to about 1,000° C. by using stabilized zirconia as an electrolyte, and has various advantages in that the SOFC has highest efficiency, emits less pollutants, causes no loss of electrolyte, and does not require supplement of electrolyte in comparison with other various types of unit cells such as a molten carbonate fuel cell (MCFC), a phosphoric acid fuel cell (PAFC), and a polymer electrolyte fuel cell (PEFC). A stack refers to a structure which is made by connecting end cells of the solid oxide fuel cell to have a high capacity.

Meanwhile, the solid oxide fuel cell (SOFC) is classified into a tubular SOFC and a planar SOFC in terms of a shape thereof, and the planar SOFC having relatively high output density tends to be preferred even though the tubular SOFC is progressive in terms of prolonged stability or a system technology.

In the case of the stack made by stacking the planar solid oxide fuel cells, the unit cell generates heat while operating, a temperature deviation occurs in the stack due to the generated heat, and the temperature deviation adversely affects an operational environment of the solid oxide fuel cell when the temperature deviation becomes severe, such that damage to constituent elements included in the stack accelerates, and durability of the solid oxide fuel cell deteriorates, and as a result, efficient power generation cannot be realized. Therefore, in a fuel cell stack structure in the related art, a heat dissipating body is disposed between upper and lower separators disposed in the fuel cell stack structure, such that a temperature deviation between a high-temperature part and a low-temperature part of the stack can be reduced, and a temperature distribution can be uniformized.

However, the fuel cell stack structure in the related art has a problem in that a thickness of the stack is increased because the heat dissipating body capable of exhibiting a cooling effect is additionally provided in the stack, and particularly, the fuel cell stack structure in the related art has a problem in that current density deteriorates in comparison with other fuel cell stack structures having the same height.

In addition, the fuel cell stack structure in the related art has a problem in that there is a limitation in uniformizing a temperature distribution in the fuel cell stack structure because the type of the heat dissipating body, which may be provided in the stack, is restricted.

Accordingly, to solve the aforementioned problems of the fuel cell stack structure in the related art, the present inventors have developed a fuel cell stack structure in which unit cells are stacked, and second window frames, which each have an area larger than an area of a first window frame, are periodically disposed at a predetermined interval in a direction in which the unit cells are stacked, such that heat movement is promoted, a temperature deviation in the fuel cell stack structure is mitigated, and a temperature distribution is uniformized.

DETAILED DESCRIPTION OF THE INVENTION

Technical Problem

An object according to an exemplary embodiment of the present invention is to provide a fuel cell stack structure in which unit cells are stacked, second window frames, which each have an area larger than an area of a first window frame, are periodically disposed at a predetermined interval in a direction in which the unit cells are stacked, and no heat dissipating body is additionally provided in a stack, such that a thickness and current density of the stack may be maintained intactly.

Another object according to the exemplary embodiment of the present invention is to provide a fuel cell stack structure in which a temperature distribution may be effectively uniformized by promoting heat movement in the fuel cell stack structure.

Technical Solution

A fuel cell stack structure according to the present invention includes a plurality of unit cells stacked in a first direction; interconnectors which are disposed and stacked at both sides of the unit cells; and window frames which support sides of the unit cells at edges of the interconnectors, in which the window frames include a first window frame and a second window frame having an area larger than an area of the first window frame, and the second window frames are periodically disposed at a predetermined interval in the first direction.

According to the exemplary embodiment, the second window frame may be disposed each time n (n is all natural numbers equal to or greater than 2) unit cells are stacked.

According to the exemplary embodiment, a thickness of the second window frame may be equal to or larger than a thickness of the first window frame.

According to the exemplary embodiment, the second window frame may extend, at a predetermined ratio of the first window frame and the second window frame, outward with respect to edges of the first window frame.

According to the exemplary embodiment, the first window frame and the second window frame may have a same shape.

According to the exemplary embodiment, an area of the interconnector may be equal to the area of the first window frame and smaller than the area of the second window frame.

According to the exemplary embodiment, the window frame may have a same shape as the interconnector.

According to the exemplary embodiment, the interconnector and the window frame may have one or more of a triangular shape, a quadrangular shape, a pentagonal shape, a hexagonal shape, an octagonal shape, an elliptical shape, and a circular shape.

According to the exemplary embodiment, the fuel cell stack structure may further include sealing members which are positioned between the unit cell, the interconnector, and the window frame.

Advantageous Effects

According to an aspect of the present invention, in the fuel cell stack structure in which the unit cells are stacked, the second window frames, which each have an area larger than an area of the first window frame, are periodically disposed at a predetermined interval in the direction in which the unit cells are stacked, and no heat dissipating body is additionally provided in the stack, such that there is an advantage in that a thickness and current density of the stack are maintained intactly.

In addition, there is an advantage in that it is possible to effectively uniformize a temperature distribution by promoting heat movement in the fuel cell stack structure.

BEST MODE

Hereinafter, the present invention will be described in detail with reference to the accompanying drawings. Here, repeated descriptions, and detailed descriptions of publicly known functions and configurations will be omitted so as to avoid unnecessarily obscuring the subject matter of the present invention. Exemplary embodiments of the present invention are provided to completely explain the present invention to a person with ordinary skill in the art. Therefore, shapes and sizes of elements illustrated in the drawings may be exaggerated for a more apparent description.

Unless explicitly described to the contrary, the word "comprise" or "include" and variations, such as "comprises", "comprising", "includes" or "including", will be understood to imply the inclusion of stated constituent elements but not the exclusion of any other constituent elements.

Hereinafter, preferred Examples for helping the understanding of the present invention will be suggested. However, the following Examples are provided just for more easily understanding the present invention, and the scope of the present invention is not limited by the Examples.

<Fuel Cell Stack Structure>

Figure 1:
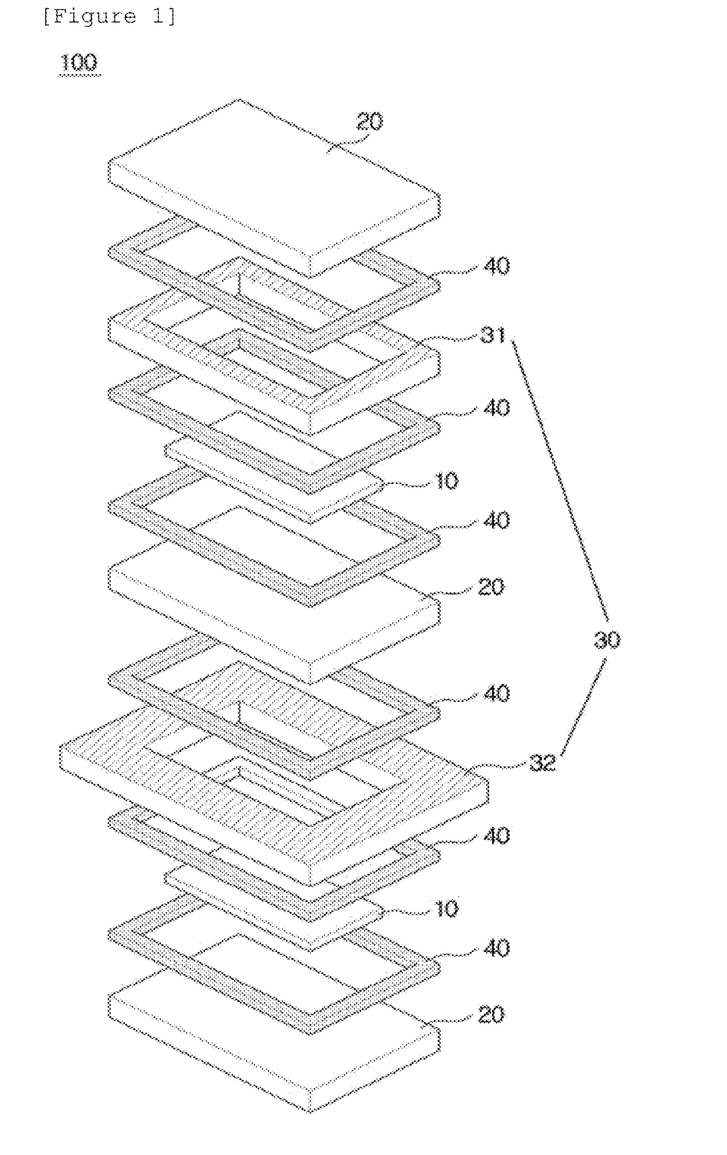
FIG. 1 is an exploded perspective view illustrating a fuel cell stack structure 100 according to an exemplary embodiment of the present invention.
Figure 2:
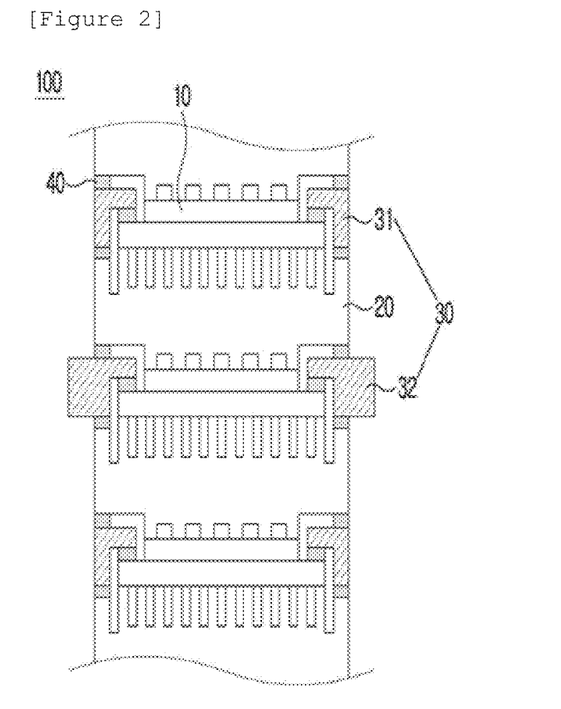
FIG. 2 is a view schematically illustrating an appearance of the fuel cell stack structure 100 according to the exemplary embodiment when viewed from the lateral side.
Figure 3:
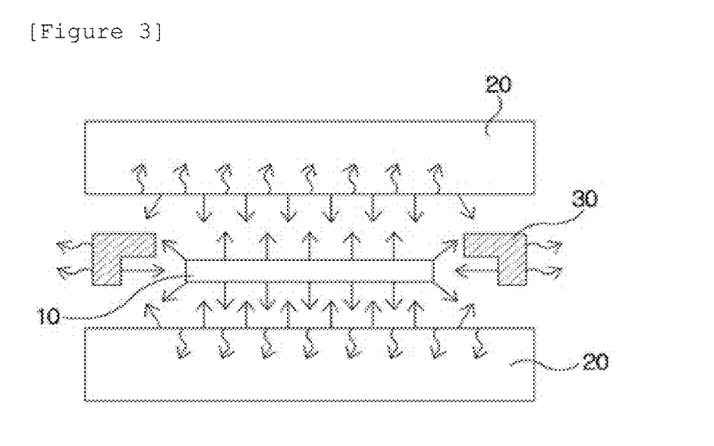
FIG. 3 is a view illustrating a method in which a unit cell 10 generates heat and the heat is transferred to the fuel cell stack structure 100.
Figure 4:
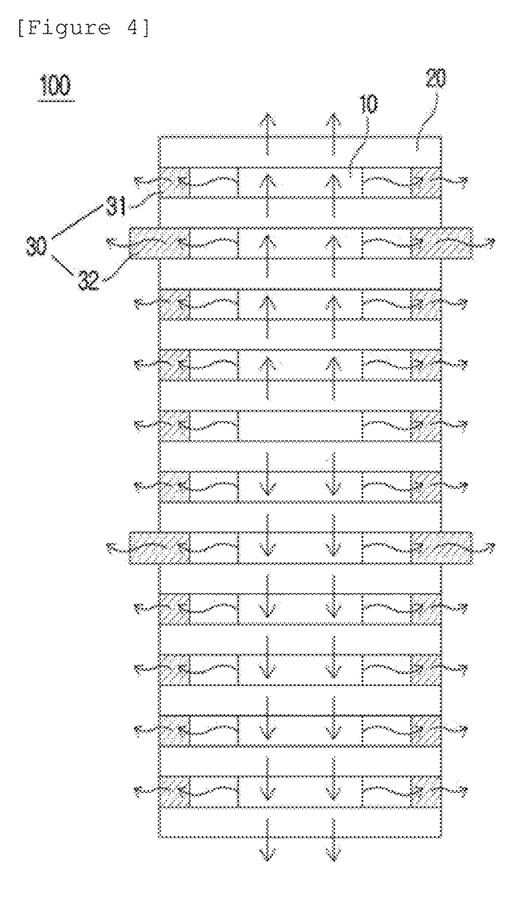
FIG. 4 is a view illustrating a direction in which heat moves in the fuel cell stack structure 100 according to the exemplary embodiment.

FIG. 1 is an exploded perspective view illustrating a fuel cell stack structure 100 according to an exemplary embodiment of the present invention, FIG. 2 is a view schematically illustrating an appearance of the fuel cell stack structure 100 according to the exemplary embodiment when viewed from the lateral side, FIG. 3 is a view illustrating a method in which a unit cell 10 according to the exemplary embodiment generates heat and the heat is transferred to the fuel cell stack structure 100, and FIG. 4 is a view illustrating a direction in which heat moves in the fuel cell stack structure 100.

The fuel cell stack structure 100 according to the exemplary embodiment of the present invention may include unit cells 10, interconnectors 20, window frames 30, and sealing members 40, and the window frames 30 may include a first window frame 31 and a second window frame 32.

First, the one or more unit cells 10, which constitute the fuel cell stack structure 100, may be stacked and may be provided in a shape having an area smaller than an area of the interconnector 20, an area of the first window frame 31, an area of the second window frame 32, and an area of the sealing member 40.

That is, the interconnector 20, the first window frame 31, the second window frame 32, and the sealing member 40 may extend, at predetermined ratios, outward from respective edges of the unit cells 10, and the unit cell 10 may have the smallest area.

In this case, the unit cell 10 includes a fuel electrode, an air electrode, and an electrolyte, the fuel electrode and the air electrode are disposed at both sides of the electrolyte, respectively, the fuel electrode is configured as a negative electrode (anode), and the air electrode is configured as a positive electrode (cathode).

When fuel is supplied to the fuel electrode and air is supplied to the air electrode, oxygen ions, which move through the electrolyte, react with hydrogen fuel to emit electrons while producing water at a side of the electrolyte adjacent to the negative electrode, while at a side of the positive electrode, the oxygen ions formed from air may move toward the negative electrode in accordance with concentration of the oxygen ions.

During this process, the oxygen ions are continuously supplied to the electrolyte, and overall electric charge is equilibrated as the oxygen ions move from the positive electrode to the negative electrode, such that useful electric power may be generated through an oxidation reaction of the fuel.

The unit cell 10 generates useful electric power while operating through the oxidation reaction of the fuel as described above, and in this case, the unit cell 10 may generate heat and transfer the heat into the fuel cell stack structure 100.

Referring to FIG. 3, an exothermic reaction occurs as the unit cell 10 operates, the generated heat is transferred to the interconnector 20 and the window frame 30 which are constituent elements of the fuel cell stack structure 100, and the interconnector 20 and the window frame 30 transfer the heat, which has been received from the unit cell 10, back to the unit cell 10.

That is, the unit cell 10, the interconnector 20, and the window frame 30 of the fuel cell stack structure 100 may transfer and receive the heat to and from one another.

The unit cell 10 transfers heat in all directions while generating heat, and in this case, the heat may be transferred to the interconnectors 20 disposed at both sides of the unit cell 10, and at the same time, the heat may be transferred to the window frame 30 disposed at the side of the unit cell 10.

The heat transferred from the unit cell 10 is transferred into the interconnector 20, and an exothermic reaction occurs in the interconnector 20 due to the heat transferred into the interconnector 20, such that the heat may be discharged back to the outside.

Likewise, the heat transferred from the unit cell 10 is transferred to the window frame 30, and an exothermic reaction occurs in the window frame 30 due to the heat transferred into the window frame 30, such that the heat may be discharged back to the outside.

Next, the interconnectors 20 are disposed at both sides of the unit cell 10 and may electrically connect the multiple unit cells 10, each of the interconnectors 20 is formed to have an area larger than an area of the unit cell 10, and the interconnectors 20 may be stacked in the direction in which the unit cells 10 are stacked.

The interconnector 20 may have one or more of various shapes such as a triangular shape, a quadrangular shape, a pentagonal shape, a hexagonal shape, an octagonal shape, an elliptical shape, and a circular shape, and the one or more interconnectors 20, which constitute the fuel cell stack structure 100, may have the same shape and the same size and may have a shape similar to a shape of the unit cell 10.

In addition, the interconnector 20 may have a shape identical to a shape of the window frame 30 and may have an area equal to an area of the first window frame 31 and smaller than an area of the second window frame 32.

That is, the interconnector 20 may extend, at a predetermined ratio, outward from the respective edges of the unit cell 10, and the extending interconnector 20 may have a size equal to a size of the first window frame 31 and smaller than a size of the second window frame 32.

The interconnector 20 may be made of one or more materials including metal, ceramics, and glass, and may include multiple protrusions and multiple grooves.

Referring to FIG. 2, the interconnectors 20 disposed at both sides of the unit cell 10 may have a structure that includes multiple concave-convex portions and is configured such that the protrusions and the grooves are repeated, and in this case, the protrusions of the interconnectors 20 may be in contact with both surfaces of the unit cells 10 to electrically connect the one or more unit cells 10.

For example, the interconnector 20 is made of a metal material formed of ferrite stainless steel containing chromium of 13% or more and may have a quadrangular shape, and the quadrangular unit cells 10 may be positioned at upper and lower sides of the interconnector 20.

Next, the window frame 30 is disposed at the side of the unit cell 10 and fixes a position of the unit cell 10, the window frame 30 has one or more of various shapes such as a triangular shape, a quadrangular shape, a pentagonal shape, a hexagonal shape, an octagonal shape, an elliptical shape, and a circular shape, the window frame 30 may have a shape identical to the shapes of the unit cell 10 and the interconnector 20, and in this case, the window frame 30 may be made of one or more materials including metal, ceramics, silicone, and glass.

The window frames 30 may include the first window frame 31 and the second window frame 32, the second window frame 32 has an area larger than an area of the first window frame 31, and the first window frame 31 and the second window frame 32 may have the same shape.

That is, the first window frame 31 may have a size equal to a size of the interconnector 20, the second window frame 32 may extend, at a predetermined ratio, outward from respective edges of the first window frame 31, and in this case, all of the unit cell 10, the interconnector 20, the first window frame 31, and the second window frame 32 may be disposed based on the same center.

Referring to FIG. 4, the first window frame 31 may be positioned at the edge of the interconnector 20 and may have a size which is matched with the line of the edge of the interconnector 20, while the second window frame 32 may be positioned at the edge of the interconnector 20 and may have a size which goes beyond the line of the edge of the interconnector 20.

The first window frame 31 and the second window frame 32 are provided at the side of the unit cell 10 while having different sizes, and in this case, the second window frame 32 may have an area larger than an area of the first window frame 31, and the second window frames 32 may be periodically disposed at a predetermined interval in the direction in which the unit cells 10 are stacked.

That is, the second window frame 32 is disposed each time the n unit cells 10 are stacked in the fuel cell stack structure 100, and in this case, n represents a natural number equal to or greater than 2.

For example, if n is 2, the second window frame 32 is disposed each time the two unit cells 10 are stacked, and in more detail, the unit cell 10 is disposed on the interconnector 20 positioned at the lowest side, the first window frame 31 may be provided at the side of the unit cell 10, and the interconnector 20 is also provided on the first window frame 31.

Next, the unit cell 10 is also disposed on the interconnector 20, the second window frame 32 is provided at the side of the unit cell 10, the interconnector 20 is also provided on the second window frame 32, and the unit cell 10 and the first window frame 31 are also disposed on the interconnector 20.

That is, the first window frames 31 and the second window frames 32 are disposed in the direction in which the unit cells 10 are stacked, and in this case, the first window frames 31 and the second window frames 32 may be disposed in the order of 1 (first window frame), 2 (second window frame), 1, 2, 1, 2 . . . .

As another example, if n is 5, the second window frame 32 is disposed each time the five unit cells 10 are stacked, and in more detail, the unit cell 10 is disposed on the interconnector 20 at the lowest side, the first window frame 31 may be disposed at the side of the unit cell 10, and the interconnector 20 may also be disposed on the first window frame 31.

Here, the first window frame 31 may be disposed at the side of the unit cell 10 until the four unit cells 10 are stacked, and the second window frame 32 may be disposed at the side of the unit cell 10 when the five unit cells 10 are stacked.

That is, the first window frames 31 and the second window frames 32 are disposed in the direction in which the unit cells 10 are stacked, and in this case, the first window frames 31 and the second window frames 32 may be disposed in the order of 1 (first window frame), 1, 1, 1, 2 (second window frame), 1, 1, 1, 1, 2 . . . .

The second window frames 32, which are periodically disposed as described above, ensure a space in the fuel cell stack structure 100 to allow heat to effectively move and promote the heat movement, such that a temperature deviation in the fuel cell stack structure 100, which is caused as the unit cells 10 operate, may be mitigated, and a temperature distribution may be uniformized.

In addition, the first window frames 31 each having a thickness of 1.5 mm to 5 mm may be stacked, the second window frames 32 each having a thickness of 2 mm to 5 mm may be stacked, the thickness of the second window frame 32 may be equal to or larger than the thickness of the first window frame 31, and in this case, the heat movement is promoted as the thickness of the second window frame 32 becomes larger within a range of 2 mm to 5 mm, such that a temperature deviation in the fuel cell stack structure 100 may be mitigated, and a temperature distribution may be uniformized.

For example, if the thickness of the first window frame 31 is 1.5 mm and the thickness of the second window frame 32 is 2 mm, heat movement is promoted, such that a temperature deviation in the fuel cell stack structure 100 is measured to be 13° C., and if the thickness of the first window frame 31 is 1.5 mm and the thickness of the second window frame 32 is 4 mm, heat movement is further promoted, such that a temperature deviation in the fuel cell stack structure 100 may be reduced by 3° C. and measured to be 10° C.

As described above, as the thickness of the second window frame 32 is increased, a space is ensured in the fuel cell stack structure 100, and heat movement is promoted by the space, such that a temperature deviation in the fuel cell stack structure 100 may be further reduced, and a temperature distribution may be further uniformized.

Therefore, the unit cell 10, the interconnector 20, the first window frame 31, the second window frame 32, the sealing member 40, a spacer, and a current collector in the fuel cell stack structure 100 are prevented from deteriorating, such that durability thereof may be improved, and performance of the fuel cell stack structure 100 may be prevented from deteriorating.

In more detail, heat, which is generated when the unit cell 10 operates, moves from a central portion to an outer peripheral portion of the fuel cell stack structure 100, the central portion of the fuel cell stack structure 100 may be a portion where the heat generated by the operation of the unit cell 10 is concentrated and a temperature is high, and the outer peripheral portion thereof may be a portion where the heat is concentrated relatively less than the central portion and a temperature is low.

The space is ensured in the fuel cell stack structure 100 and the heat movement is promoted so that the heat may be effectively moved from the second window frames 32 periodically disposed, and thus the heat at the central portion having a high temperature moves to the outer peripheral portion having a low temperature, such that a temperature deviation in the fuel cell stack structure 100 may be mitigated, a temperature distribution may be uniformized, deterioration of the fuel cell stack structure 100 may be prevented, and durability of the fuel cell stack structure 100 may be improved.

In addition, as the thicknesses of the second window frames 32 periodically disposed are increased, the space is further ensured in the fuel cell stack structure 100, and thus the heat at the central portion having a high temperature more effectively moves to the outer peripheral portion having a low temperature, such that a temperature deviation in the fuel cell stack structure 100 may be mitigated, and deterioration of the fuel cell stack structure 100 may be prevented.

Next, the sealing members 40 are disposed between the unit cell 10, the interconnector 20, the first window frame 31, and the second window frame 32 and may fix the respective constituent elements of the fuel cell stack structure 100, and the sealing member 40 may be made of one or more materials including rubber, silicone, polymeric materials, metal, ceramics, and glass.

The sealing member 40 may have a shape identical to the shapes of the interconnector 20, the first window frame 31, and the second window frame 32, and sizes of the sealing members 40 may be differently configured in accordance with the sizes of the unit cell 10, the interconnector 20, the first window frame 31, and the second window frame 32.

The sealing members 40 may be disposed between the interconnector 20 and the first window frame 31, between the unit cell 10 and the first window frame 31, between the interconnector 20 and the second window frame 32, and between the unit cell 10 and the second window frame 32.

In this case, the sealing members 40 may be differently sized and disposed in accordance with the unit cell 10, the interconnector 20, the first window frame 31, and the second window frame 32 which are the constituent elements of the fuel cell stack structure 100.

In addition, the sealing members 40 may serve to fix the positions of the unit cell 10, the interconnector 20, the first window frame 31, and the second window frame 32 in the fuel cell stack structure 100.

Next, the fuel cell stack structure 100 may further include the spacer (not illustrated) and the current collector (not illustrated).

The spacers are positioned between the unit cell 10, the interconnector 20, and the window frame 30 to maintain predetermined intervals, and in this case, the spacer may include one or more of mica, ceramics, silicone, and rubber.

The current collector may be positioned at both the outer side of the air electrode and the outer side of the fuel electrode of the unit cell 10 or only at one of the outer sides of the air electrode and the fuel electrode, the current collector may collect electricity generated when the unit cell 10 operates, and in this case, the current collector may include one or more materials including lanthanum cobalt oxide ($LaCoO_3$), lanthanum strontium cobalt oxide (LSC), lanthanum strontium cobalt iron oxide (LSCF), lanthanum strontium manganese oxide (LSM), and lanthanum strontium iron oxide (LSF).

MANUFACTURE EXAMPLE

In a 40-cell stack structure in which the 40 unit cells were stacked, the second window frame was disposed each time the five unit cells are stacked. The thicknesses of the first window frame and the second window frame were within a range of 5 to 10 mm, the sizes of the first window frame and the second window frame were within a range of 150 to 200 mm, and in this case, the size of the second window frame was larger by 5 mm or more than the sizes of the interconnector and the first window frame.

COMPARATIVE EXAMPLE

A stack structure, in which unit cells were stacked and window frames having only one size were provided, were configured to be identical to the manufacture example except that no second window frame was included.

EXPERIMENTAL EXAMPLE 1

Measurement of In-Plane Distribution of Fuel Cell Stack Structure

Figure 5:
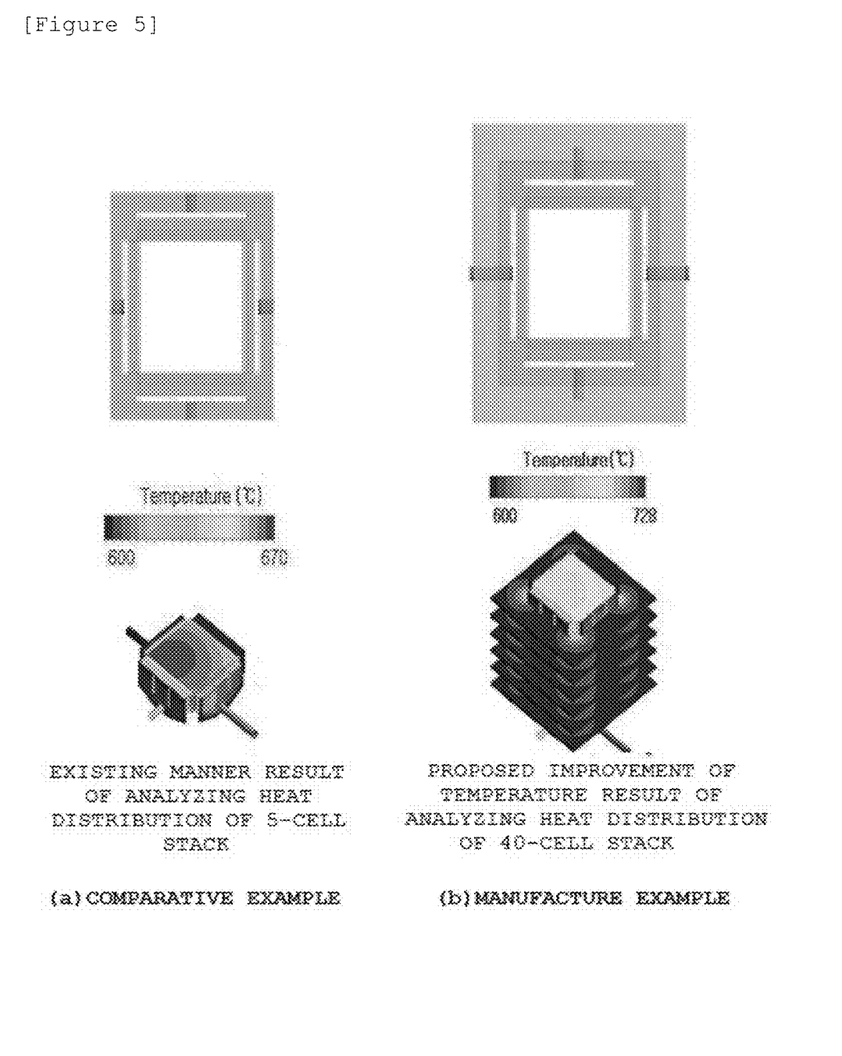
FIG. 5 is a view illustrating a comparison between an in-plane temperature distribution in a fuel cell stack structure according to a manufacture example of the present invention and an in-plane temperature distribution in a fuel cell stack structure according to a comparative example.

Referring to FIG. 5, FIG. 5A illustrates an in-plane temperature distribution measured based on the 5 unit cells in the fuel cell stack structure of the comparative example in which no second window frame 32 is included, and FIG. 5B illustrates an in-plane temperature distribution measured based on the 40 unit cells in the fuel cell stack structure of the manufacture example.

In the comparative example, the in-plane temperature distribution was measured based on the 5 unit cells, the highest temperature was measured to be 673° C., the lowest temperature was measured to be 634° C., and a temperature deviation was measured to be about 40° C., and in the manufacture example, the in-plane temperature distribution was measured based on the 40 unit cells, the highest temperature was measured to be 684° C., the lowest temperature was measured to be 662° C., and a temperature deviation was measured to be 20° C.

That is, it can be seen that even though the in-plane temperature distribution was measured based on the 40 unit cells in the manufacture example in which more unit cells are stacked, the in-plane temperature distribution in the manufacture example was uniformly measured in comparison with the comparative example in which the in-plane temperature distribution was measured based on the 5 unit cells.

EXPERIMENTAL EXAMPLE 2

Measurement of Temperature Distribution of Fuel Cell Stack Structure

Figure 6:
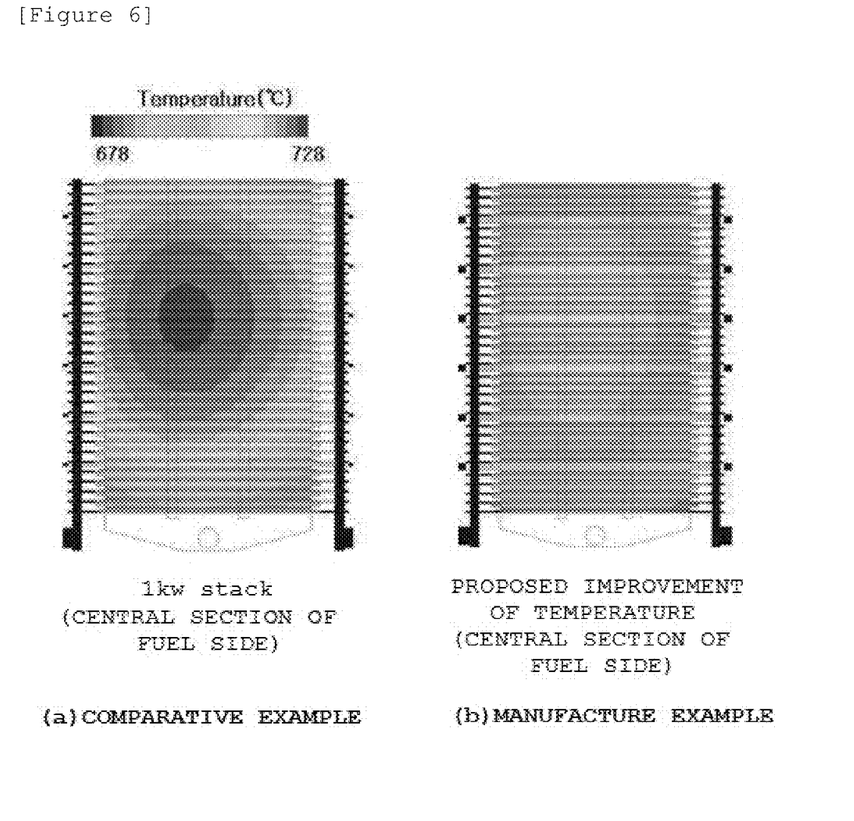
FIG. 6 is a view illustrating a comparison between a temperature distribution in the fuel cell stack structure according to the manufacture example of the present invention and a temperature distribution in the fuel cell stack structure according to the comparative example.

Referring to FIG. 6, FIG. 6A illustrates a measured temperature distribution of the comparative example which includes no second window frame and has the 40-cell stack structure in which the 40 unit cells are stacked, and FIG. 6B illustrates a measured temperature distribution of the manufacture example which has the 40-cell stack structure in which the 40 unit cells are stacked and the second window frame was disposed each time the five unit cells are stacked.

A great temperature deviation occurred between the central portion and the outer peripheral portion at an operating temperature of 650° C. in the fuel cell stack structure of the comparative example, a temperature of about 720° C. was measured at the central portion because a temperature at the central portion is relatively higher than a temperature at the outer peripheral portion, and a temperature of about 701° C. was measured at the outer peripheral portion, such that a temperature deviation of about 20° C. was measured.

In contrast, in the fuel cell stack structure of the manufacture example, a temperature deviation between the central portion and the outer peripheral portion was reduced at an operating temperature of 650° C., a temperature at the central portion having the highest temperature was measured to be 703° C., and a temperature at the outer peripheral portion having the lowest temperature was measured to be about 690° C., such that a temperature deviation of about 10° C. was measured.

That is, it can be seen that the temperature deviation of the manufacture example is further mitigated in comparison with the temperature deviation of the comparative example.

Figure 7:
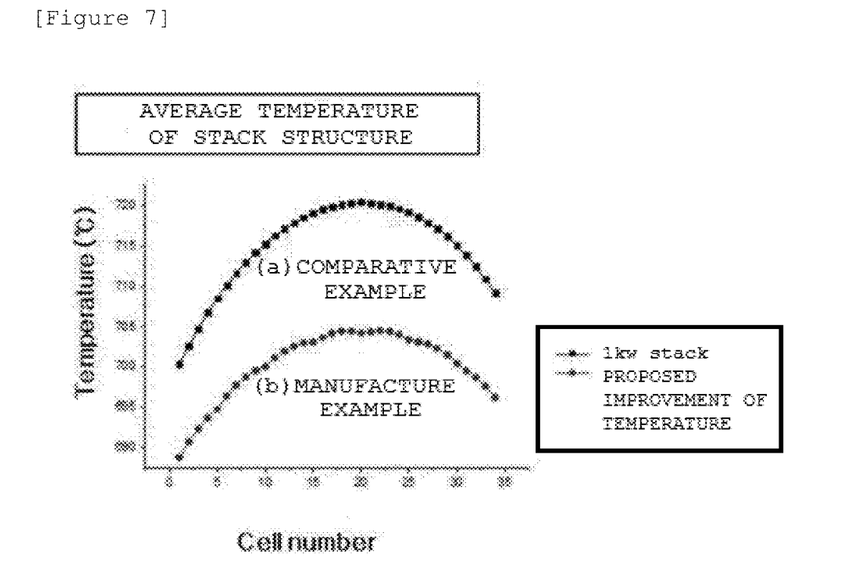
FIG. 7 is a view illustrating a measured average temperature of the fuel cell stack structure according to the manufacture example of the present invention and a measured average temperature of the fuel cell stack structure according to the comparative example.

Referring to FIG. 7, FIG. 7A illustrates a measured average temperature of the comparative example which includes no second window frame 32, and FIG. 7B illustrates a measured average temperature of the manufacture example.

In the comparative example, the highest temperature was about 720° C., and the lowest temperature was about 700° C., such that the temperature deviation of about 20° C. was measured, and in the manufacture example, the highest temperature was about 700° C., and the lowest temperature was about 690° C., such that the temperature deviation of about 10° C. was measured.

That is, considering the comparison between the average temperature deviation of the manufacture example and the average temperature deviation of the comparative example, it can be seen that the average temperature deviation of the manufacture example was further mitigated, and it can be seen that an overall average temperature was measured to be lower in the manufacture example.

Figure 8:
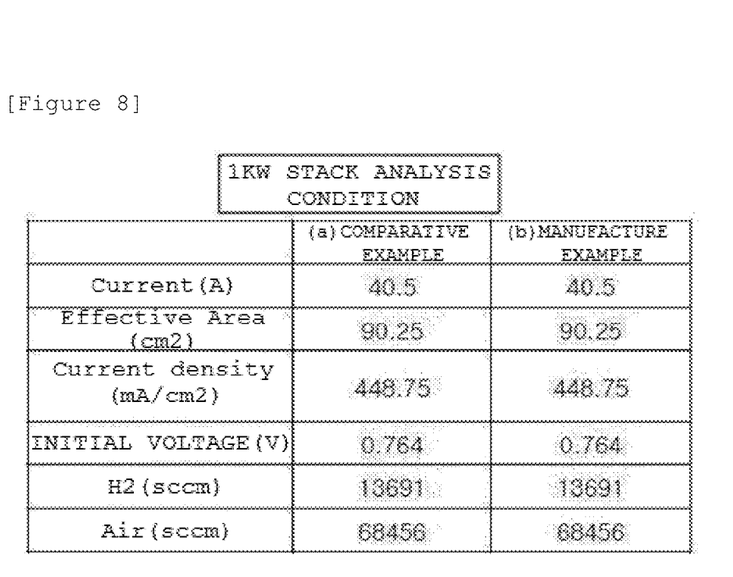
FIG. 8 is a view illustrating measured amounts of current, measured effective areas, measured current density, and measured initial voltages of the fuel cell stack structure according to the manufacture example of the present invention and the fuel cell stack structure according to the comparative example.

Referring to FIG. 8, FIG. 8A illustrates a measured amount of current, a measured effective area, measured current density, and a measured initial voltage of the comparative example which includes no second window frame 32, and FIG. 8B illustrates a measured amount of current, a measured effective area, measured current density, and a measured initial voltage of the manufacture example.

In the comparative example, the amount of current was measured to be 40.5 A, the current density was measured to be 90.25 cm$^2$, the current density was measured to be 448.75 mA/cm$^2$, and the initial voltage was measured to be 0.764 V, and in the manufacture example, the amount of current was measured to be 40.5 A, the current density was measured to be 90.25 cm$^2$, the current density was measured to be 448.75 mA/cm$^2$, and the initial voltage was measured to be 0.764 V.

That is, it can be seen that even though the second window frames 32 are periodically disposed in the manufacture example, the values of the amount of current, the effective area, the current density, and the initial voltage of the manufacture example are equal to the values of the amount of current, the effective area, the current density, and the initial voltage of the comparative example which includes no second window frame 32, and it can be seen that the temperature deviation is mitigated and the temperature distribution is uniformized in the manufacture example while the amount of current, the effective area, the current density, and the initial voltage are maintained intactly.

While the exemplary embodiments of the present invention have been described above, it may be understood by those skilled in the art that the present invention may be variously modified and changed without departing from the spirit and scope of the present invention disclosed in the claims.

The invention claimed is:

1. A fuel cell stack structure comprising:
   a plurality of unit cells stacked in a first direction;
   interconnectors which are disposed and stacked at opposite sides of each of the plurality of unit cells so that an upper surface and a lower surface of each of the plurality of unit cells directly contacts one of the interconnectors; and
   window frames which support sides of the unit cells at edges of the interconnectors,
   wherein the window frames include at least one first window frame and at least one second window frame having an area larger than an area of the at least one first window frame,
   wherein the at least one second window frame is periodically disposed at a predetermined interval in the first direction, and
   wherein a thickness in the first direction of the at least one second window frame is larger than a thickness in the first direction of the at least one first window frame.

2. The fuel cell stack structure of claim 1, wherein the least one first window frame is a plurality of first window frames and the least one second window frame is a plurality of second window frames, and
   wherein the plurality of second window frames are disposed each time n unit cells are stacked, wherein n represents a natural number equal to or greater than 2.

3. The fuel cell stack structure of claim 1, wherein the at least one second window frame extends, at a predetermined ratio of the first window frame and the second window frame, outward in a second direction with respect to each of two opposed edges of the first window frame.

4. The fuel cell stack structure of claim 1, wherein the at least one first window frame and the at least one second window frame have a same shape.

5. The fuel cell stack structure of claim 1, wherein an area of each of the interconnectors is equal to the area of the at least one first window frame and smaller than the area of the at least one second window frame.

6. The fuel cell stack structure of claim 1, wherein the window frames have a same shape as the interconnectors.

7. The fuel cell stack structure of claim 1, wherein the interconnectors and the window frames have one of a triangular shape, a quadrangular shape, a pentagonal shape, a hexagonal shape, an octagonal shape, an elliptical shape, and a circular shape.

8. The fuel cell stack structure of claim 1, further comprising:
   sealing members which are positioned between the plurality of unit cells, the interconnectors, and the window frames.

9. The fuel cell stack structure of claim 5, wherein the window frames have a same shape as the interconnectors.

10. The fuel cell stack structure of claim 5, wherein surfaces of the interconnectors contacting the upper surface and the lower surface of each of the plurality of unit cells have a plurality of protrusions.

* * * * *